US012734473B2

(12) United States Patent
Jing et al.

(10) Patent No.: US 12,734,473 B2
(45) Date of Patent: Sep. 15, 2026

(54) CATALYST REACTOR

(71) Applicant: Taiyuan University of Technology, Tiayuan (CN)

(72) Inventors: Jieying Jing, Tiayuan (CN); Jinpeng Zhang, Tiayuan (CN); Lulu Li, Tiayuan (CN); Wenying Li, Tiayuan (CN)

(73) Assignee: Taiyuan University of Technology, Tiayuan (CN)

( * ) Notice: Subject to any disclaimer, the term of this patent is extended or adjusted under 35 U.S.C. 154(b) by 0 days.

(21) Appl. No.: 19/435,838

(22) Filed: Dec. 30, 2025

(65) Prior Publication Data

US 2026/0192236 A1 Jul. 9, 2026

(30) Foreign Application Priority Data

Jan. 7, 2025 (CN) ........................ 202510019777.0

(51) Int. Cl.
*B01D 53/04* (2006.01)
*B01J 8/04* (2006.01)
(Continued)

(52) U.S. Cl.
CPC ..... *B01D 53/0423* (2013.01); *B01D 53/0438* (2013.01); *B01J 8/0453* (2013.01);
(Continued)

(58) Field of Classification Search
CPC ............ B01D 53/0423; B01D 53/0438; B01J 8/0453; B01J 8/0457
See application file for complete search history.

(56) References Cited

U.S. PATENT DOCUMENTS 4,465,234 A * 8/1984 Maehara ............ B05B 17/0638 239/406
2002/0110504 A1 8/2002 Gittleman et al.

FOREIGN PATENT DOCUMENTS

CN 108096992 A * 6/2018 ............ F23G 7/063
CN 115971885 A 4/2023
(Continued)

OTHER PUBLICATIONS

Ruhaimi, Magnesium oxide-based adsorbents for carbon dioxide capture: Current progress and future opportunities (Year: 2021).*
(Continued)

*Primary Examiner* — Claire X Wang
*Assistant Examiner* — Alyssa Lee Kuykendall
(74) *Attorney, Agent, or Firm* — Bayramoglu Law Offices LLC

(57) ABSTRACT

A catalyst reactor is provided. The reactor includes a reactor body, a multi-station turntable, and an adsorbent chamber. The reactor body has a split structure and includes an upper reactor and a lower reactor that are fixedly connected, and a space adapted to the adsorbent chamber is formed between the upper reactor and the lower reactor. The multi-station turntable is provided with at least two sets of mounting holes, and the adsorbent chamber is disposed within the mounting holes. A heating base is arranged below the multi-station turntable and located on one side of the lower reactor. The catalyst reactor enables the timely repositioning of the adsorbent chamber via the multi-station turntable. The heating base is utilized to apply heat to restore the original functions. After restoration, the multi-station turntable is rotated again to replace the adsorbent chamber within the reactor body.

7 Claims, 3 Drawing Sheets

(51) Int. Cl.
*C01B 3/382* (2026.01)
*C01B 3/56* (2006.01)

(52) U.S. Cl.
CPC ........... *B01J 8/0457* (2013.01); *B01J 8/0492* (2013.01); *C01B 3/382* (2013.01); *C01B 3/56* (2013.01); *B01D 2253/1124* (2013.01); *B01D 2256/16* (2013.01); *B01D 2257/502* (2013.01); *B01D 2259/40088* (2013.01); *B01D 2259/403* (2013.01); *C01B 2203/0227* (2013.01); *C01B 2203/042* (2013.01); *C01B 2203/047* (2013.01)

(56) References Cited

FOREIGN PATENT DOCUMENTS

| | | | | | |
|---|---|---|---|---|---|
| CN | 219881125 | U | * | 10/2023 | |
| CN | 220828861 | U | * | 4/2024 | |
| CN | 119215604 | A | * | 12/2024 | ............. B01J 20/34 |
| CN | 223353709 | U | * | 9/2025 | |
| KR | 20050019092 | A | | 2/2005 | |

OTHER PUBLICATIONS

CN_119215604_translation (Year: 2024).*
CN_219881125_translation (Year: 2023).*
CN_220828861_translation (Year: 2024).*
CN_223353709_translation (Year: 2025).*
CN_108096992_A translation (Year: 2018).*

* cited by examiner

CATALYST REACTOR

CROSS REFERENCE TO THE RELATED APPLICATIONS

This application is based upon and claims priority to Chinese Patent Application No. 202510019777.0, filed on Jan. 7, 2025, the entire contents of which are incorporated herein by reference.

TECHNICAL FIELD

The present invention relates to the technical field of chemical equipment, and in particular, to a catalyst reactor.

BACKGROUND

A fuel cell is an energy conversion device capable of continuously converting chemical energy into electrical energy, with advantages such as being clean and efficient, and the fuel cell is of great significance for improving the environment and achieving sustainable energy development. Currently, the hydrogen source required for fuel cells is primarily obtained from fossil fuels, from chemical by-products through extraction, from bio-methanol/methane, and obtained by using natural energy sources like solar or wind power. However, the storage and transportation of externally supplied hydrogen require high costs and have significant safety risks, constraining the supply of hydrogen source for fuel cells. Hydrogen source technology has become one of the technical bottlenecks limiting the further commercial application of fuel cells.

Currently, on-site hydrogen production technology via reforming reactions using hydrocarbons such as gasoline, diesel, natural gas, and methanol as raw materials has become a research focus both domestically and internationally. The hydrogen production method offers advantages such as high energy density and high energy conversion efficiency. In addition, liquid fuels are easy to store and transport, and have advantages over hydrogen in terms of cost-effectiveness and safety. A large amount of CO is inevitably generated during the hydrogen production through hydrocarbon fuel reforming. To further increase the $H_2$ content and eliminate the poisoning effects of CO on platinum electrodes in fuel cells, a water-gas shift reaction is required for the gas after hydrocarbon fuel reforming.

Most existing reactors use magnesium oxide-based adsorbents to absorb CO from incoming materials, and the CO is then discharged after treatment. However, after the adsorbent has been used for a period of time, the effectiveness decreases, and thermal treatment is required for regeneration. In the existing reactors, restoring the adsorbent involves removing the adsorbent chamber and replacing the adsorbent within the chamber. This process is relatively cumbersome, resulting in longer reactor downtime.

SUMMARY

The present invention aims to address the deficiencies in the prior art by proposing a catalyst reactor.

To achieve the foregoing objectives, the following technical solutions are described in the present invention.

A catalyst reactor is provided, including a reactor body, a multi-station turntable, and an adsorbent chamber, where the reactor body has a split structure and includes an upper reactor and a lower reactor that are fixedly connected, and a space adapted to the adsorbent chamber is formed between the upper reactor and the lower reactor; the multi-station turntable is provided with at least two sets of mounting holes, and the adsorbent chamber is disposed within the mounting holes; and a heating base is arranged below the multi-station turntable and located on one side of the lower reactor.

Further, the adsorbent chamber has a cylindrical structure, with ventilation grids provided on both an upper end face and a lower end face, and the adsorbent chamber is filled with magnesium oxide-based particles.

Further, the mounting holes are oblong holes, a cross-section of the adsorbent chamber is circular, sliders are fixedly connected to outer walls on both sides of the adsorbent chamber, limit rods are fixedly connected to the multi-station turntable, and the sliders are slidably connected to the limit rods; a reset spring rod is arranged on a side of the mounting holes near the center of the multi-station turntable, and one end of the reset spring rod is fixedly connected to a mounting base, and the other end abuts against the outer wall of the adsorbent chamber; and a vibration frame is provided on an outer side of the multi-station turntable and located on one side of the heating base.

Further, a first vibration motor is provided within the vibration frame, an output end of the first vibration motor is provided with a first vibration block, and the first vibration block abuts against the outer wall of the adsorbent chamber.

Further, three sets of mounting holes are arranged, with an included angle of 120° between the three sets of mounting holes, corresponding respectively to a reaction station, a spraying station, and a heating station on the multi-station turntable, where the spraying station includes a liquid storage hopper, a liquid guide frame, and a spray head, the liquid storage hopper is arranged at the bottom of the spraying station, the spray head is arranged at the top of the spraying station, and the liquid storage hopper and the spray head are connected via the liquid guide frame.

Further, a filter plate is provided within the liquid storage hopper, a liquid receiving chamber is formed above the filter plate to collect liquid dripping from the adsorbent chamber, a liquid storage chamber is formed below the filter plate, and a pump is arranged within the liquid storage chamber and connected to the spray head via a liquid outlet pipe.

Further, a second vibration motor is provided within the liquid guide frame, an output end of the second vibration motor is provided with a second vibration block, and the second vibration block abuts against the outer wall of the adsorbent chamber.

Further, the multi-station turntable includes a base, a drive motor, and an indexing plate, and the drive motor is fixedly connected to the base and drives the indexing plate.

Further, a first lifting frame is arranged on an outer wall of the upper reactor, an upper sealing pipe is provided at a free end of the first lifting frame, a second lifting frame is arranged on an outer wall of the lower reactor, a lower sealing pipe is provided at a free end of the second lifting frame, outer diameters of the upper reactor, the lower reactor, and the adsorbent chamber are the same, an inner diameter of the upper sealing pipe and an outer diameter of the upper reactor are the same, and an inner diameter of the lower sealing pipe and an outer diameter of the lower reactor are the same.

Beneficial Effects

Compared with the prior art, the present invention has the following beneficial effects: The catalyst reactor provided in the present invention enables the timely repositioning of the adsorbent chamber via the multi-station turntable. The heating base is utilized to apply heat to restore the original functions. After restoration, the multi-station turntable is rotated again to replace the adsorbent chamber within the reactor body, and the replaced adsorbent chamber can be heated and regenerated to reduce reactor downtime.

BRIEF DESCRIPTION OF THE DRAWINGS

The accompanying drawings are provided to give a further understanding of the present invention and constitute a part of the specification. The drawings are used together with embodiments of the present invention to explain the present invention and do not constitute a limitation on the present invention.

Figure 1:
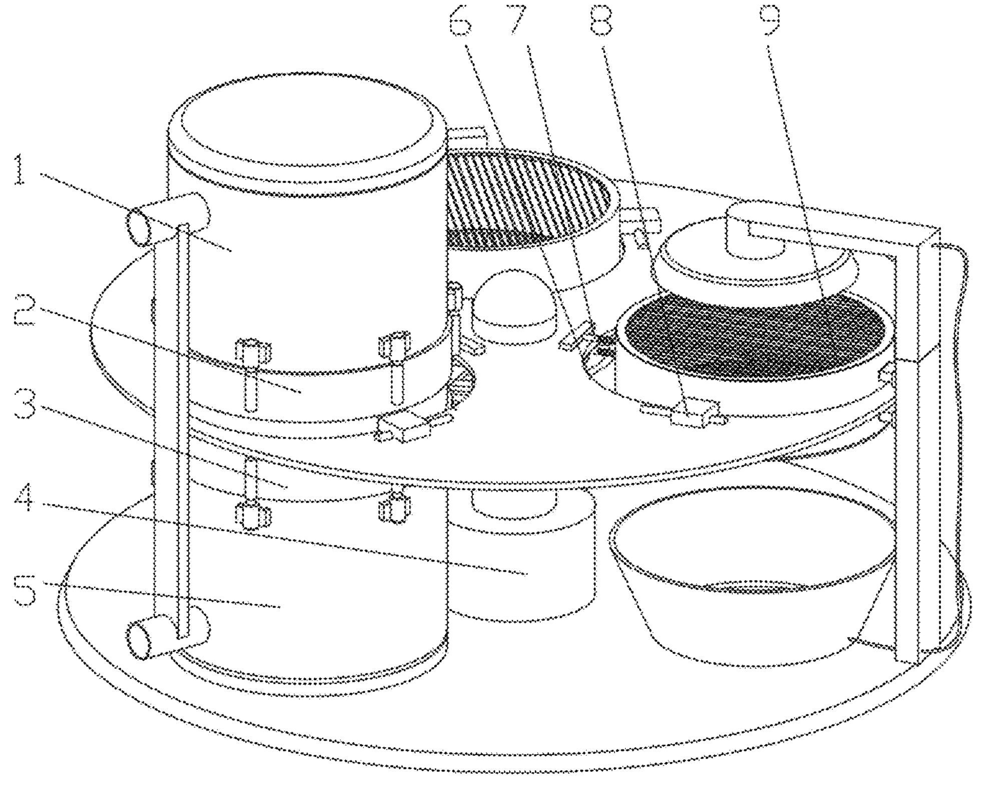
FIG. 1 to FIG. 3 are schematic diagrams of an overall structure of a catalyst reactor.

In the drawing: 1. Upper reactor; 2. Upper sealing pipe; 3. Lower sealing pipe; 4. Drive motor; 5. Lower reactor; 6. Mounting hole; 7. Reset spring rod; 8. Slider; 9. Adsorbent chamber; 10. Spray head; 11. Liquid outlet pipe; 12. Liquid storage hopper; and 13. Heating base.

DETAILED DESCRIPTION OF THE EMBODIMENTS

Embodiments of this application are described in detail below, and examples of embodiments are illustrated in the accompanying drawings. The same or similar reference numerals indicate the same or similar components or components with the same or similar functions. The following embodiments with reference to the accompanying drawings are examples and intended to explain this application, and should not be construed as a limitation on this application. All other embodiments obtained by a person of ordinary skill in the art based on embodiments of this application without creative efforts shall fall within the protection scope of this application.

In the descriptions of this application, it should be understood that, an orientation or a position relationship indicated by terms such as "center", "longitudinal", "transverse", "length", "width", "thickness", "up", "down", "front", "rear", "left", "right", "vertical", "horizontal", "top", "bottom", "inner", "outer", "clockwise", "counterclockwise", "axial", "circumferential", and "radial" depends on an orientation or a position relationship shown in the accompanying drawings, and the terms are only intended for the purpose of describing this application and simplifying the descriptions, rather than indicating or implying that the referred device or component must have a specific orientation, or be constructed and operated in a specific orientation, and therefore cannot be construed as a limitation on this application.

In addition, the terms "first" and "second" mentioned below are merely intended for the purpose of description, and shall not be understood as an indication or implication of relative importance or an implicit indication of the number of indicated technical features. Therefore, a feature limited by "first" or "second" may explicitly or implicitly include one or more features. In the descriptions of this application, unless otherwise specifically limited, the term "a plurality of" means two or more than two.

In this application, unless otherwise explicitly specified and limited, terms such as "mounting", "interconnected", "connected", and "fixed" should be understood in a broad sense. For example, the terms may refer to a fixed connection, a detachable connection, or an integral connection; or refer to a mechanical connection or an electrical connection; or refer to a direct connection, an indirect connection through an intermediate medium, or communication between two components. A person of ordinary skill in the art may interpret specific meanings of the foregoing terms in this application according to specific cases.

Figure 2:
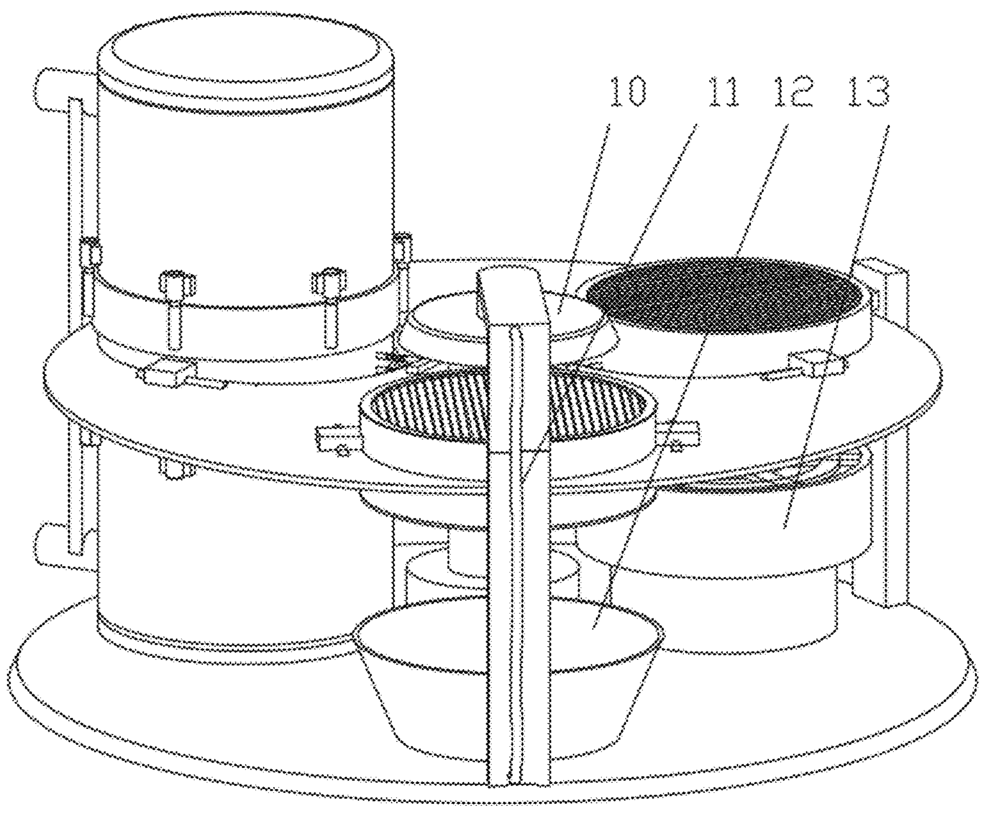
Figure 2:
Figure 3:
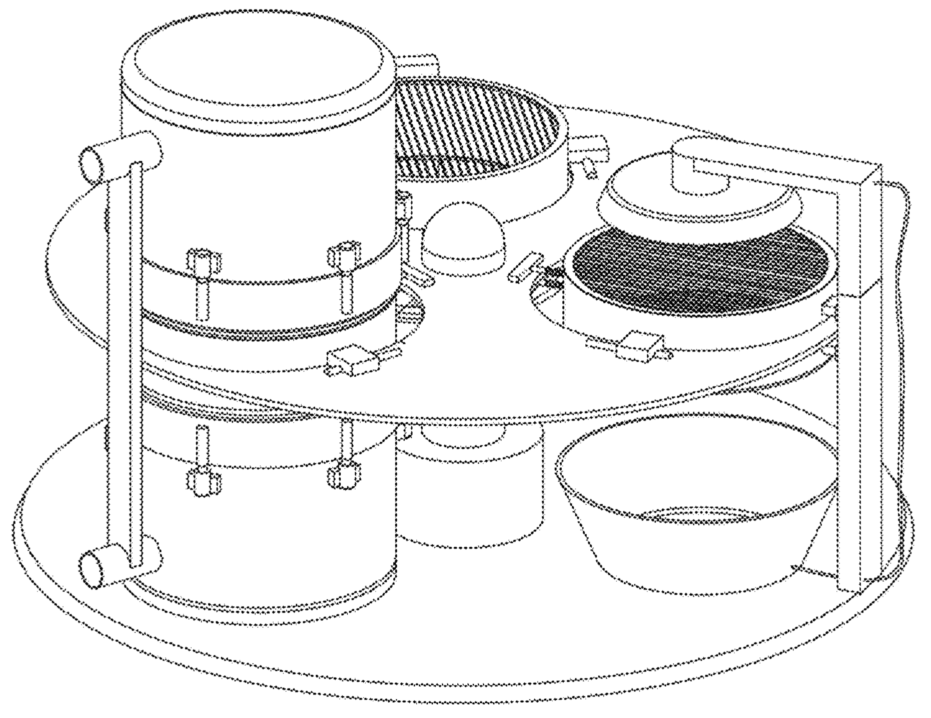
Figure 4:
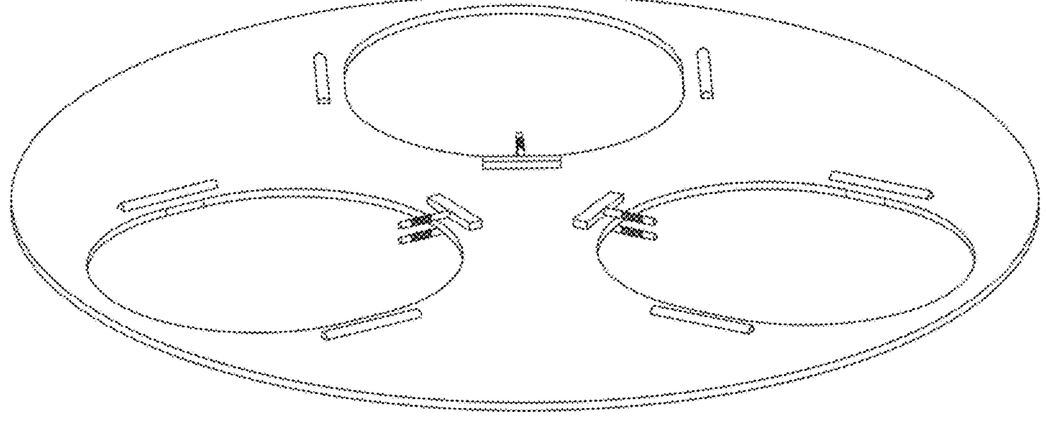
FIG. 4 is a diagram of a structure of an indexing plate.

Refer to FIG. 1 to FIG. 4. A catalyst reactor is provided, including a reactor body, a multi-station turntable, and an adsorbent chamber 9, where the reactor body has a split structure and includes an upper reactor 1 and a lower reactor 5 that are fixedly connected, and a space adapted to the adsorbent chamber 9 is formed between the upper reactor 1 and the lower reactor 5; the multi-station turntable is provided with at least two sets of mounting holes 6, and the adsorbent chamber 9 is disposed within the mounting holes 6; and a heating base 13 is arranged below the multi-station turntable and located on one side of the lower reactor 5.

During operation, materials are fed into an inlet at the bottom of the reactor body. The reaction proceeds from bottom to top, and after the CO passes through the adsorbent chamber 9, the adsorbent captures the CO from the materials, to increase the $H_2$ content and eliminate the poisoning effects of CO on platinum electrodes in fuel cells. After the adsorbent has been used for a period of time, the effectiveness decreases, and thermal treatment is required for regeneration to restore the original performance. By using the multi-station turntable, the position of the adsorbent chamber 9 can be changed. The heating base 13 is utilized to apply heat to restore the original functions. After restoration, the multi-station turntable is rotated again to replace the adsorbent chamber 9 within the reactor body, and the replaced adsorbent chamber 9 can be heated and regenerated. The heating base 13 includes an upper heating pipe and a lower blower fan. The blower fan directs the heat generated by the heating pipe into the adsorbent chamber 9.

A plurality of catalyst layers are provided within the upper reactor 1 and/or the lower reactor 5, including: a Ni-based catalyst layer (for example, alumina-supported Ni catalysts, Ni—Fe composite oxide catalysts, ceria-supported Ni catalysts, zirconia-supported Ni catalysts, or a combination thereof); an Fe-based catalyst layer (for example, Fe—Cr composite oxide catalysts, Fe—Ce—Al composite oxide catalysts, Fe—Ce—Zr composite oxide catalysts, Fe—Zr—Al composite oxide catalysts, or a combination thereof); and a Cu-based catalyst layer (for example, Cu—Zn—Al composite oxide catalysts, noble metal-doped $Cu/Al_2O_3$ catalysts, Ce-doped or Zr-doped $Cu/Al_2O_3$ catalysts, or a combination thereof).

In another preferred embodiment, the adsorbent chamber 9 has a cylindrical structure, with ventilation grids provided on both an upper end face and a lower end face, and the adsorbent chamber 9 is filled with magnesium oxide-based particles.

In another preferred embodiment, the mounting holes 6 are oblong holes, a cross-section of the adsorbent chamber 9 is circular, sliders 8 are fixedly connected to outer walls on both sides of the adsorbent chamber 9, limit rods are fixedly connected to the multi-station turntable, and the sliders 8 are slidably connected to the limit rods; a reset spring rod 7 is arranged on a side of the mounting holes 6 near the center of the multi-station turntable, and one end of the reset spring rod 7 is fixedly connected to a mounting base, and the other end abuts against the outer wall of the adsorbent chamber 9; and a vibration frame is provided on an outer side of the multi-station turntable and located on one side of the heating base 13. According to the reset spring rod 7, the adsorbent chamber 9 can be maintained in a state abutting the edge of the mounting holes 6 at the reaction station, to adapt to the operation of the reactor body. When the adsorbent chamber 9 moves to the heating station, the first vibration block and the reset spring rod 7 can work together to shake adsorbent particles within the adsorbent chamber 9, ensuring uniform heating of the adsorbent particles within the chamber.

Specifically, a first vibration motor is provided within the vibration frame, an output end of the first vibration motor is provided with a first vibration block, and the first vibration block abuts against the outer wall of the adsorbent chamber 9.

Specifically, three sets of mounting holes 6 are arranged, with an included angle of 120° between the three sets of mounting holes 6, corresponding respectively to a reaction station, a spraying station, and a heating station on the multi-station turntable, where the spraying station includes a liquid storage hopper 12, a liquid guide frame, and a spray head 10, the liquid storage hopper 12 is arranged at the bottom of the spraying station, the spray head 10 is arranged at the top of the spraying station, and the liquid storage hopper 12 and the spray head 10 are connected via the liquid guide frame. According to the spraying station, active ingredients can be sprayed onto the surface of the adsorbent particles, allowing timely replenishment when depletion occurs (when depletion is low, spraying replenishment can be performed after the multi-station turntable rotates multiple times).

A filter plate is provided within the liquid storage hopper 12, a liquid receiving chamber is formed above the filter plate to collect liquid dripping from the adsorbent chamber 9, a liquid storage chamber is formed below the filter plate, and a pump is arranged within the liquid storage chamber and connected to the spray head 10 via a liquid outlet pipe 11.

A second vibration motor is provided within the liquid guide frame, an output end of the second vibration motor is provided with a second vibration block, and the second vibration block abuts against the outer wall of the adsorbent chamber 9. According to the configuration of the structure, the second vibration block and the reset spring rod 7 can work together to shake adsorbent particles within the adsorbent chamber 9, ensuring uniform spraying on the adsorbent particles within the chamber.

In another preferred embodiment, the multi-station turntable includes a base, a drive motor 4, and an indexing plate, and the drive motor 4 is fixedly connected to the base and drives the indexing plate.

In another preferred embodiment, a first lifting frame is arranged on an outer wall of the upper reactor 1, an upper sealing pipe 2 is provided at a free end of the first lifting frame, a second lifting frame is arranged on an outer wall of the lower reactor 5, a lower sealing pipe 3 is provided at a free end of the second lifting frame, outer diameters of the upper reactor, the lower reactor, and the adsorbent chamber are the same, an inner diameter of the upper sealing pipe 2 and an outer diameter of the upper reactor 1 are the same, and an inner diameter of the lower sealing pipe 3 and an outer diameter of the lower reactor 5 are the same. According to the configuration of the structure, the sealing effects between the reactor body and the adsorbent chamber 9 can be enhanced, preventing gas leakage during reaction.

The foregoing descriptions are merely preferred and specific implementations of the present invention, but are not intended to limit the protection scope of the present invention. Any equivalent replacement or variation according to the technical solutions and inventive concepts of the present invention made by a person skilled in the art within the technical scope disclosed in the present invention shall fall within the protection scope of the present invention.

What is claimed is:

1. A catalyst reactor, comprising a reactor body, a multi-station turntable, and an adsorbent chamber, wherein the reactor body has a split structure and comprises an upper reactor and a lower reactor, the upper reactor and the lower reactor are fixedly connected, and a space adapted to the adsorbent chamber is formed between the upper reactor and the lower reactor; the multi-station turntable is provided with at least two sets of mounting holes, and the adsorbent chamber is disposed within the mounting holes; and a heating base is arranged below the multi-station turntable and located on a side of the lower reactor; and the mounting holes are oblong holes, a cross-section of the adsorbent chamber is circular, sliders are fixedly connected to outer walls on both sides of the adsorbent chamber, limit rods are fixedly connected to the multi-station turntable, and the sliders are slidably connected to the limit rods; a reset spring rod is arranged on a side of the mounting holes near a center of the multi-station turntable, a first end of the reset spring rod is fixedly connected to a mounting base, and a second end of the reset spring rod abuts against the outer wall of the adsorbent chamber; and a vibration frame is provided on an outer side of the multi-station turntable and located on a side of the heating base; wherein three sets of mounting holes are arranged, with an included angle of 120° between the three sets of mounting holes, corresponding respectively to a reaction station, a spraying station, and a heating station on the multi-station turntable, wherein the spraying station comprises a liquid storage hopper, a liquid guide frame, and a spray head, the liquid storage hopper is arranged at a bottom of the spraying station, the spray head is arranged at a top of the spraying station, and the liquid storage hopper and the spray head are connected via the liquid guide frame.

2. The catalyst reactor according to claim 1, wherein the adsorbent chamber has a cylindrical structure, with ventilation grids provided on both an upper end face and a lower end face, and the adsorbent chamber is filled with magnesium oxide-based particles.

3. The catalyst reactor according to claim 1, wherein a first vibration motor is provided within the vibration frame, an output end of the first vibration motor is provided with a first vibration block, and the first vibration block abuts against the outer wall of the adsorbent chamber.

4. The catalyst reactor according to claim 1, wherein a filter plate is provided within the liquid storage hopper, a liquid receiving chamber is formed above the filter plate to collect liquid dripping from the adsorbent chamber, a liquid storage chamber is formed below the filter plate, and a pump is arranged within the liquid storage chamber and connected to the spray head via a liquid outlet pipe.

5. The catalyst reactor according to claim 1, wherein a second vibration motor is provided within the liquid guide frame, an output end of the second vibration motor is provided with a second vibration block, and the second vibration block abuts against the outer wall of the adsorbent chamber.

6. The catalyst reactor according to claim 1, wherein the multi-station turntable comprises a base, a drive motor, and an indexing plate, and the drive motor is fixedly connected to the base and drives the indexing plate.

7. The catalyst reactor according to claim 1, wherein a first lifting frame is arranged on an outer wall of the upper reactor, an upper sealing pipe is provided at a free end of the first lifting frame, a second lifting frame is arranged on an outer wall of the lower reactor, a lower sealing pipe is provided at a free end of the second lifting frame, outer diameters of the upper reactor, the lower reactor, and the adsorbent chamber are the same, an inner diameter of the upper sealing pipe and the outer diameter of the upper reactor are the same, and an inner diameter of the lower sealing pipe and the outer diameter of the lower reactor are the same.

* * * * *